United States Patent [19]

Heitz

[11] Patent Number: 4,963,622
[45] Date of Patent: Oct. 16, 1990

[54] PARALOID EXTRUSION AIDS FOR HIGH MOLECULAR WEIGHT HDPE FILM RESINS

[75] Inventor: William D. Heitz, Flagtown, N.J.

[73] Assignee: Union Carbide Chemicals and Plastics Company Inc., Danbury, Conn.

[21] Appl. No.: 372,466

[22] Filed: Jun. 28, 1989

[51] Int. Cl.$^5$ .................... C08L 23/20; C08L 23/10; C08L 23/04; C08L 33/12
[52] U.S. Cl. ............................................. 525/227
[58] Field of Search ......................................... 525/227

[56] References Cited

U.S. PATENT DOCUMENTS 4,156,703  5/1979  Harrop .............................. 525/227

FOREIGN PATENT DOCUMENTS 55-164209  12/1980  Japan ................................. 525/227
1511683  5/1978  United Kingdom .

Primary Examiner—Carman J. Seccuro
Attorney, Agent, or Firm—Clement J. Vicari

[57] ABSTRACT

A process for improving bubble stability, reducing film gauge variation and reducing melt fracture during extrusion and formation of film from a high density polyolefin of molecular weight above 225,000 to about 450,000 which comprises blending with said polyolefin about 0.1 to about 0.8% of an acrylic polymer polymerized from a monomer system comprising at least 50% by weight of methyl methacrylate.

7 Claims, No Drawings

PARALOID EXTRUSION AIDS FOR HIGH MOLECULAR WEIGHT HDPE FILM RESINS

FIELD OF THE INVENTION

The present invention relates to a process for extruding film formed from high molecular weight high density polyethylene resin and more particularly to a process for improving bubble stability of high molecular weight, HDPE film extruded by the bubble technique.

BACKGROUND OF THE INVENTION

High molecular weight, high density polyethylene (HMW HDPE) film resins for tough thin film applications are generally extruded by the bubble technique at high extrusion rates through small diameter dies. The high extrusion rates are conducted by the film manufacturer to minimize production costs so that products can be marketed at competitive prices. Generally small dies are used to attain the high blow up ratios required to produce film with sufficient strength for the various tough thin film applications. Because the performance requirements are very stringent only HMW HDPE resins, which have broad, bimodal molecular weight distributions (MWDs) are able to compete effectively in the marketplace. Resins that do have these characteristics do not extrude well at equally high rates because of bubble instability, higher variation of melt distribution within the die, excessive power usage and poorer film quality as compared to the leading resins. The poorer film quality can manifest itself as higher gauge variation, weaker strength and poorer appearance.

Although HMW HDPE resins produced by the UNIPOL Process possess numerous advantages, it has been found that they do not have the molecular structure required to produce film for the highest performance applications because of extrusion and film strength deficiencies. Studies to overcome these deficiencies have focused on changes in key resin properties (molecular weight, molecular weight distribution, (MWD) and comonomer) and the development of new additives, particularly those additives that enhance the extrusion characteristics of the resin, such as improved bubble stability, film gauge variation reduction and melt fracture elimination. Fluoroelastomers are effective in eliminating the melt fracture generally encountered with HMW HDPE and can slightly reduce power draw (5%) during extrusion by forming a lubricating coating on the extruder barrel, screw and die (see U.S. Pat. No. 3,125,547 issued on Mar. 17, 1964 and assigned to Dupont Corporation). However the fluoro elastomers require a long extrusion period — approximately one hour — to complete the coating. This creates higher amounts of scrap film for the film producer, which the film producer does not incur with leading competitive resins. Additionally, unacceptably high film gauge variation is frequently encountered because the fluoroelastomer coating is not always distributed uniformly. As a result, the higher gauge variation can reduce film strength and detract from the appearance of the film.

Zinc stearate and blends of zinc stearate and calcium stearate have also been demonstrated to eliminate melt fracture and reduce film gauge variation resulting from use of HMW HDPE resins without lengthy equipment conditioning periods. However, melt fracture can recur at high extrusion rates and/or low melt temperatures when used in high molecular weight HDPE film resin (<7.0 HLMI) that do not have very broad molecular weight distributions (Mw/Mn <20). Increasing the melt temperature will broaden the extrusion rate range over which melt fracture is not incurred with the stearates, but higher melt temperatures will also limit extrusion rates by lowering melt strength, which causes higher bubble instability. In addition to lowering the extrusion rate, higher melt temperatures and poor bubble stability will also have a deleterious effect on film quality.

Current literature teaches the use of acrylic polymers for reducing melt fracture occurrence during processing of polyvinyl chloride (See for example the publication entitled "Acrloid K-147" processing aid for polyvinyl chloride by Rohm & Haas Company, Industrial Chemicals Department).

In addition, British Patent Specification 1,511,683 published May 24, 1978 and assigned to Rohm & Haas Company, Inc. discloses the use of 1% to 25% by weight of acrylic polymers produced from a monomer system comprising at least 50% by weight of methyl methacrylate for improving the processability of polyethylenes having a molecular weight of over 600,000 (Mv).

In an effort to reduce melt fracture occurring during processing of HMW HDPE resins of molecular weight of about 250,000 to 420,000 and produced by the low pressure fluidized bed process as disclosed in e.q., U.S. Pat. No. 4,508,842 or 4,383,095 it was found that surprisingly, not only was melt fracture reduced to acceptable levels but advantageously bubble stability was improved dramatically, film gauge variations were reduced significantly and melt fracture was eliminated at relatively high extrusion rates utilizing acrylic polymers at significantly lower concentrations than would be expected.

Indeed, the concentration found useful according to the present invention results in significantly lower costs of operation and advantaqeously in view of the low concentration utilized i.e., about 0.15% to about 0.75%. The films can be used in polyethylene products designated for food contact packaging.

STATEMENT OF THE INVENTION

Broadly contemplated the present invention provides a process for improving bubble stability, reducing film gauge variation and reducing melt fracture during extrusion and formation of film from high density polyolefin of molecular weight above 225,000 to about 450,000 which comprises blending with said polyolefin about 0.1 to about 0.8% of an acrylic polymer polymerized from a monomer system comprising at least 50% by weight of methyl methacrylate.

DESCRIPTION OF THE PREFERRED EMBODIMENTS

The polyolefins contemplated for use in the present invention can be homopolymers or copolymers of ethylene, propylene, butene, hexene or terpolymers of these monomers. The polyolefins can be produced by conventional techniques well known to the act such as by the solution, slurry or gas phase fluidized bed process. It is preferred to produce these resins such as by the gas phase fluidized process disclosed in U.S. Pat. No. 4,508,842 or U.S. Pat. No. 4,383,095.

The polyolefins which can be processed according to the present invention have molecular weights of about 225,000 to about 450,000. These resins can have medium to broad molecular weight distributions (MWD) i.e, polydispersity indexes (Mw/Mn) of about 10 to about 30 and be uni- or bimodal molecular weight distributions.

The acrylic polymers contemplated for use according to the present invention are those of molecular weight (Mw) of about 100,000 to about 1,000,000. It is preferred however to employ acrylic polymers of molecular weight of about 100,000 to 200,000. A particularly preferred acrylic polymer is available from Rohm & Haas under the tradename "Paraloid K147".

The monomer system, polymerized by known methods to the acrylic polymer, must however, comprise at least 50 percent by weight, and more preferably 100 percent of methyl methacrylate. The remainder (if any) of the monomer system is preferably one or more $C_1$ to $C_{25}$ alkyl acrylates such as methyl acrylate, ethyl acrylate and butyl acrylate. Isobornyl methacrylate is another useful comonomer.

The acrylic polymer is a polymer either prepared by a single stage or multistage process which can be of one, two or more stages. Sequential polymerization to produce "core-shell" or "graft" polymers is well known.

The acrylic polymer is useful to improve the bubble stability, reduce film gauge variation and reduce melt fracture of the polyethylene at levels from about 0.1% by weight of the polyethylene to about 0.8%.

The blend of the acrylic polymer and the polyolefin is a heterogeneous mixture, i.e, the two substances are incompatible, as indicated by the opaque or translucent characteristics of the blend.

Having set forth the general nature of the invention, the following examples illustrate some specific embodiments of the invention. It is to be understood, however, that this invention is not limited to the examples, since the invention may be practiced by the use of various modifications.

In the Examples the properties and composition of the polymers and the film were determined by the following methods:

| | |
|---|---|
| Dart Impact Strength | ASTM-D1709 Method A |
| Elmendorf Tear, N/mm | ASTM-D1992 |
| Melt Strength | Melt strength measured by clamping a suitable weight to a film specimen 1 inch × 1 1 inch in dimension so as to measure the property in either the machine or traverse direction. The weighted specimen then completely immersed in an oil bath at an elevated temperature (124° C.). The time for the film to pull apart under the weight attached was recorded as the melt strength in seconds. For example, for 4 mil sample, an 18 gram weight is usually used which gives a stress of 8.3 psi in oil. Failure time is usually between 10–70 seconds. Temperatures and weights are varied according to film thickness and melting points. |
| Tensile Strength | ASTM D882 Method A |
| Haze | ASTM 1003-61 - Percentage of transmitted light scattered more than 2.5° from the normal incident beam. Reported as percent haze. |

In the following examples an acrylic copolymer (Paraloid K-147) was evaluated as an extrusion aid in several HDPE film resins and its performance was compared to base resin containing antioxidants but no extrusion aid, and a blended extrusion aid consisting of 0.15% zinc stearate and 0.15% calcium stearate. Resins containing the stearate blend were selected as the control resin since their performance comes closest to meeting the requirements of HMW HDPE film products.

EXAMPLE 1

In the following example, a resin was prepared according to the procedure disclosed in U.S. Pat. No. 4,011,382 using a chromium catalyst. The resin produced was a copolymer of ethylene and hexene at a weight ratio of about 98 to 2. Four different samples of pellets were prepared from the resin and four different types of masterbatch as indicated in Table I below:

TABLE I

| Sample No. | #1 | #2 | #3 | #4 |
|---|---|---|---|---|
| Primary Antioxidant % | 0.15 | 0.15 | 0.15 | 0.15 |
| Secondary Antioxidant % | 0.15 | 0.15 | 0.15 | 0.15 |
| Paraloid K-147, % | — | — | 0.1 | 0.3 |
| Zinc Stearate, % | — | 0.15 | — | — |
| Calcium Stearate, % | — | 0.15 | — | — |
| Melt Index, $I_2$, dg/min | 0.17 | 0.18 | 0.17 | 0.15 |
| Melt Index, $I_5$, dg/min | 0.96 | 1.02 | 1.03 | 0.77 |
| Melt Index, $I_{21}$, dg/min | 17.9 | 18.1 | 18.0 | 16.3 |
| MW | 225,000 | 225,000 | 225,000 | 225,000 |
| Mw/Mn | 20 | 20 | 20 | 20 |

The four samples of pellets were thereafter extruded into blown film using a 50 mm, 18:1 40 Alpine extruder equipped with a 75 mm die, with a 1.0 mm die gap. For samples 2, 3 and 4 two films for each sample were produced at thicknesses of 0.8 mils, and 0.5 mils. Hence for clarity these films are referred to as 2, 2A; 3, 3a and 4, 4A, respectively. The conditions and results of the extrusion into blown films are indicated in Table IA below:

TABLE IA

| Sample | #1 | 2,2A | 3,3A | 4,4A |
|---|---|---|---|---|
| Temperature, °F. | | | | |
| Barrel Zone #1 | 380 | 380 | 380 | 380 |
| Barrel Zone #2 | 380 | 380 | 380 | 380 |
| Adaptor Zone #3 | 380 | 380 | 380 | 380 |
| Adaptor Zone #4 | 385 | 385 | 385 | 385 |
| Die Bottom Zone #5 | 390 | 390 | 390 | 390 |
| Die Middle Zone #6 | 390 | 390 | 390 | 390 |
| Die Top Zone #7 | 390 | 390 | 390 | 390 |
| Melt Temperature, °F. | 390 | 383 | 389 | 388 |
| Screw Speed, rpm | 100 | 100 | 100 | 100 |
| Drive Amps | 61.3 | 58.0 | 56.5 | 56.0 |
| Extrusion Rate, lb/h | 95 | 101 | 93 | 95 |
| Wind-Up Speed, ft/min. | — | — | — | — |
| Nominal Film Gauge, mils | — | 0.8, 0.5 | 0.8, 0.5 | 0.8, 0.5 |
| Blow-Up Ratio | 4:1 | 4:1 | 4:1 | 4:1 |
| Layflat, inches | 20 | 20 | 20 | 20 |
| Frost Line Height, in. | — | 38, 39 | 38, 39 | 38, 39 |
| Neck Height, inches | — | 29, 29 | 28, 28 | 28, 28 |
| Neck-In, inches | — | 0, ⅛ | ⅛, ⅛ | ⅛, ⅛ |
| Melt Pressure, psi | 4,650 | 4,470 | 4,490 | 4,690 |
| Internal Bubble Pressure, in-$H_2O$ | — | 13/16, 13/16 | 13/16, ⅞ | 13/16, ⅞ |

Observations made during the runs indicate that sample #1 with no extrusion aid had heavy melt fracture and could not produce film because of bubble instability. No melt fracture was observed with samples containing zinc stearate/calcium stearate or Paraloid K 147.

Sample #2 had a fairly stable bubble at 100 rpm but some chatter was observed along with a hint of melt fracture.

Conditioning of the extruder and die was not required with Sample #3 and #4 which contained 0.1% and 0.3% Paraloid K-147, respectively. The bubble was substantially more stable with the Paraloid additive at each concentration.

EXAMPLE 2

In this Example 2, the key mechanical properties of the films produced in Example 1, i.e, Film samples 2, 2A; 3, 3A and 4, 4A were determined and the results are indicated in Table 2 below:

TABLE 2

| Sample No. | #1 | 2 | 2A | 3 | 3A | 4 | 4A |
|---|---|---|---|---|---|---|---|
| Film Gauge, mils | — | 0.8 | 0.5 | 0.8 | 0.5 | 0.8 | 0.5 |
| Dart Impact, g | — | 200 | 181 | 210 | 177 | 206 | 179 |
| Elemdorf Tear, N/mm | | | | | | | |
| MD | — | 10.0 | 6.2 | 8.8 | 6.8 | 8.0 | 6.0 |
| TD | — | 42.1 | 30.5 | 58.4 | 70.8 | 46.0 | 45.2 |
| Tensile Strength MPa | | | | | | | |
| MD | — | 48.9 | 50.9 | 53.2 | 54.6 | 55.3 | 54.6 |
| TD | — | 410 | 320 | 490 | 430 | 510 | 490 |
| Haze Level, % | | | | | | | |
| $\bar{x}^1$ | — | 53.9 | 45.1 | 45.9 | 52.1 | 58.9 | 47.6 |
| $SD^2$ | — | 0.0941 | 0.078 | 0.045 | 0.030 | 0.055 | 0.037 |
| Melt Strength @ 130° C.$^{(2)}$ Sec and 38 KPa × MD Stress Level $\bar{x}$ | — | 38.8 | — | 36.8 | — | 68.8 | — |
| SD | — | 3.7 | — | 6.3 | — | 5.5 | — |
| TD | — | 9.4 | — | 16.8 | — | 11.9 | — |
| SD | — | 3.9 | — | 5.9 | — | 3.5 | — |

$^{(1)}\bar{x}$ is the mean value;
$^{(2)}$SD is the Standard Deviation

EXAMPLE 3

This example demonstrates the gauge variation encountered on the film bubble containing stearate extrusion aids as compared to the additive of the present invention. The films utilized were the films produced in Example 1 i.e., film samples 2, 2A; 3, 3A; and 4, 4A. Measurements were taken approximately every two inches around the circumference of the film bubble. The average gauge, standard deviation and coefficient of variation was calculated for the films produced from each sample. The results are indicated in Table 3 below.

TABLE 3

| Sample No. | 2 | 2A | 3 | 3A | 4 | 4A |
|---|---|---|---|---|---|---|
| Gauge, mils | 0.85 | 0.75 | 0.90 | 0.60 | 0.95 | 0.70 |
| | 0.90 | 0.75 | 0.95 | 0.60 | 0.95 | 0.70 |
| | 1.00 | 0.70 | 0.90 | 0.65 | 0.98 | 0.69 |
| | 1.12 | 0.79 | 0.90 | 0.70 | 1.00 | 0.69 |
| | 0.85 | 0.69 | 0.90 | 0.65 | 0.98 | 0.70 |
| | 0.95 | 0.72 | 0.95 | 0.65 | 0.90 | 0.69 |
| | 1.01 | 0.75 | 0.90 | 0.60 | 0.88 | 0.65 |
| | 1.00 | 0.80 | 0.89 | 0.63 | 0.85 | 0.62 |
| | 0.92 | 0.70 | 0.92 | 0.65 | 0.83 | 0.62 |
| | 1.00 | 0.62 | 0.96 | 0.80 | 0.85 | 0.68 |
| | 0.86 | 0.55 | 0.85 | 0.60 | 0.85 | 0.69 |
| | 0.95 | 0.55 | 0.85 | 0.65 | 0.85 | 0.80 |
| | 0.80 | 0.55 | 0.82 | 0.67 | 0.90 | 0.75 |
| | 0.90 | 0.65 | 0.80 | 0.65 | 0.98 | 0.72 |
| | 1.00 | 0.70 | 0.85 | 0.65 | 0.90 | 0.68 |
| | 0.82 | 0.75 | 0.90 | 0.63 | 0.85 | 0.65 |
| | 0.80 | 0.70 | 0.90 | 0.65 | 0.85 | 0.67 |
| | 0.85 | 0.80 | 0.95 | 0.65 | 0.90 | 0.68 |
| | 0.88 | 0.69 | 0.95 | 0.67 | 0.95 | 0.68 |
| $\bar{x}$ | 0.917 | 0.682 | 0.897 | 0.644 | 0.908 | 0.687 |
| SD | 0.094 | 0.078 | 0.045 | 0.030 | 0.055 | 0.037 |
| Coefficient of Variation | 10.26 | 11.33 | 4.97 | 4.66 | 6.10 | 5.37 |

EXAMPLE 4

In this example, another resin was prepared according to the procedure disclosed in U.S. Pat. No. 4,011,382. The resin produced was a copolymer of ethylene and hexene at a weight ratio of 98.8 to 1.2 respectively.

Five different samples of pellets were prepared from the resin and five different masterbatches as indicated in Table 4 below:

TABLE 4

| Sample No. | #1 | #2 | #3 | #4 | #5 |
|---|---|---|---|---|---|
| Primary Antioxidant % | 0.05 | 0.05 | 0.05 | 0.05 | 0.05 |
| Secondary Antioxidant % | 0.08 | 0.08 | 0.08 | 0.08 | 0.08 |
| Paraloid K-147, % | — | — | 0.1 | 0.2 | 0.3 |
| Zinc Stearate, % | 0.08 | 0.15 | 0.08 | 0.08 | 0.08 |
| Calcium Stearate, % | — | 0.15 | — | — | — |
| Melt Index, $I_2$, dg/min | 0.082 | 0.083 | 0.050 | 0.052 | 0.050 |
| Melt Index, $I_5$, dg/min | 0.392 | 0.363 | 0.230 | 0.248 | 0.254 |
| Melt Index, $I_{21}$, dg/min | 7.68 | 8.59 | 6.00 | 5.51 | 5.49 |
| MW | 340,000 | 340,000 | 340,000 | 340,000 | 340,000 |
| Mw/Mn | 20 | 20 | 20 | 20 | 20 |

The five samples of pellets were thereafter extruded into blown film in the same extruder as in example 1. For samples 2, 3, 4 and 5, two films were produced from pellet samples 2, and three films each from pellet samples 3, 4 and 5. Hence for clarity these films are referred to as 2, 2A; 3, 3A, 3B; 4, 4A, 4B and 5, 5A, 5B. The conditions and results of the extrusion into blown films are indicated in Table 4A below:

TABLE 4A

| Sample No. | 1 | 2 | 2A | 3 | 3A | 3B | 4 | 4A | 4B | 5 | 5A | 5B |
|---|---|---|---|---|---|---|---|---|---|---|---|---|
| Temperatures, °F. | | | | | | | | | | | | |
| Barrel Zone #1 | 380 | 380 | | 380 | | 380 | 380 | | 380 | 380 | | 380 |
| Barrel Zone #2 | 380 | 380 | | 380 | | 380 | 380 | | 380 | 380 | | 380 |
| Adaptor #3 | 380 | 380 | | 380 | | 380 | 380 | | 380 | 380 | | 380 |
| Adaptor #4 | 385 | 385 | | 385 | | 385 | 385 | | 385 | 385 | | 385 |
| Die Bottom Zone #5 | 400 | 400 | | 400 | | 400 | 400 | | 400 | 400 | | 400 |
| Die Middle Zone #6 | 400 | 400 | | 400 | | 400 | 400 | | 400 | 400 | | 400 |
| Die Top Zone #7 | 400 | 400 | | 400 | | 400 | 400 | | 400 | 400 | | 400 |
| Melt Temp., °F. | 394 | 391 | 394 | 392 | 392 | 395 | 392 | | 397 | 393 | 393 | 398 |

TABLE 4A-continued

| Sample No. | 1 | 2 | 2A | 3 | 3A | 3B | 4 | 4A | 4B | 5 | 5A | 5B |
|---|---|---|---|---|---|---|---|---|---|---|---|---|
| Melt Press., psi | 8550 | 8230 | 6069 | 7020 | | 8860 | 6930 | | 9100 | 6130 | | 9200 |
| Screw speed | 100 | 100 | 59 | 59 | 59 | 90 | 59 | 59 | 120 | 59 | 59 | 140 |
| Drive amps | 62.5 | 61.3 | 59.0 | 55.4 | 55.2 | 61.9 | 55.6 | 55.6 | 66 | 51.2 | 51.2 | — |
| Extrusion Rate, lbs/h | 100 | 101 | 62 | 62 | 62 | 105 | 66 | 66 | 131 | 64 | 64 | — |
| Wind-up Speed, ft/min | — | 115 | 90 | 90 | 120 | 117 | 96 | 128 | 180 | 95 | 126 | see comments Item 5 |
| Nominal Gauge, mils | — | 0.9 | 0.8 | 0.8 | 0.5 | 0.8 | 0.8 | 0.5 | 0.8 | 0.8 | 0.5 | |
| Blow-Up Ratio | 4:1 | 4:1 | 4:1 | 4:1 | 4:1 | 4:1 | 4:1 | 4:1 | 4:1 | 4:1 | 4:1 | 4:1 |
| Layflat, inches | 20 | 19 | 19 | 19 | 19 | 19 | 19 | 19 | 19 | 19 | 19 | 19 |
| Frost Lines Height, inches | 38 | 38 | 38 | 38 | 38 | 38 | 38 | 38 | 38 | 38 | 38 | 38 |
| Neck Height, inches | — | 29 | 29 | 29 | 29 | 29 | 29 | 29 | 29 | 29 | 29 | 29 |
| Neck-in, inches | — | ½ | ½ | ½ | ⅜ | ⅜ | ½ | ⅜ | ⅜ | ½ | ⅜ | |
| Internal Bubble Press., in-H$_2$O | — | 1.1 | 1.0 | 1.0 | 1.1 | 1.1 | 1.0 | 1.0 | 1.1 | — | — | |

Comments:
1. Resin without extrusion aid was unable to produce good film for evaluation primarily because of melt fracture.
2. Material containing zinc stearate/calcium stearate produced melt fracture in film at extrusion rates exceeding 62 lbs/hr.
3. At 0.1% K-147 screw speed could be increased to 90 rpm with no melt fracture - bubble very stable.
4. At 0.2% K-147 no melt fracture at 120 rmp (151 lb/h) and higher. Bubble very stable.
5. At 0.3% K-147 same performance was obtained as at 0.2% K-147. Screw speed could be increased to 140 rmp with no melt fracture and bubble was stable. However, frost line could not be controlled at 38" because of cooling limitation.

EXAMPLE 5

In this example, the key mechanical properties of some films produced in Example 4 were determined. The films tested were Samples 1, 2, 2A, 3, 3A, 4, 4A, 4B and 5, 5A. The results are indicated in Table 5.

TABLE 5

| Sample No. | | 1 | 2 | 2A | 3 | 3A | 4 | 4A | 4B | 5 | 5A |
|---|---|---|---|---|---|---|---|---|---|---|---|
| Film Property | | | | | | | | | | | |
| Extrusion Rate, lb/hr | | — | 101 | 62 | 62 | 62 | 66 | 66 | 131 | 64 | 64 |
| Dart Impact, g | | — | 328 | 248 | 338 | 270 | 271 | 280 | 353 | 222 | 236 |
| Elmendorf Tear, N/mm | MD | — | 9.2 | 64 | 6.8 | 5.3 | 7.2 | 6.4 | 6.0 | 7.6 | 6.8 |
| | TD | — | 19.6 | 22.4 | 30.4 | 29.6 | 40.8 | 29.6 | 24.8 | 24.4 | 16.8 |
| Tensile Strength, MPa | MD | — | 61.6 | 80 | 70.0 | 72.8 | 61.6 | 72.1 | 77.0 | 68.9 | 77.7 |
| | TD | — | 46.9 | 67.9 | 51.8 | 42.1 | 53.2 | 65.1 | 61.6 | 60.2 | 66.5 |
| Haze Level, % | X̄ | — | 73.7 | 62.6 | 69.3 | 61.9 | 70.0 | 66.7 | 59.8 | 69.8 | 65.3 |
| | SD | | | | | | | | | | |
| Melt Strength @ 135, Sec. and 266 KPa | MD | — | 21.7 | — | 33.1 | — | — | — | — | 52.8 | — |
| | SD | — | 2.0 | — | 5.1 | — | — | — | — | 3.9 | — |
| Gauge, mils | X̄ | — | 1.15 | 0.67 | 0.80 | 0.61 | 0.82 | 0.54 | 0.78 | 0.76 | 0.54 |
| | SD | — | 0.32 | 0.08 | 0.08 | 0.08 | 0.08 | 0.05 | 0.09 | 0.05 | 0.05 |

EXAMPLE 6

This example demonstrates the gauge variation encountered in some of the film containing stearate as compared to the additive of the present invention. Measurements were taken approximately every four inches around the circumference of the bubble. The average gauge, standard deviation and coefficient of variation were calculated for the film produced from each sample and the samples tested were 2, 2A; 3, 3A; 4, 4A and 5, 5A. The results are indicated in Table 6.

TABLE 6

| Sample No. | 2 | 2A | 3 | 3A | 4 | 4A | 5 | 5A |
|---|---|---|---|---|---|---|---|---|
| Gauge, mils | 1.00 | 0.80 | 0.80 | 0.60 | 0.80 | 0.50 | 0.70 | 0.50 |
| | 1.20 | 0.80 | 0.80 | 0.50 | 0.80 | 0.60 | 0.80 | 0.50 |
| | 1.40 | 0.80 | 0.90 | 0.50 | 0.80 | 0.60 | 0.80 | 0.60 |
| | 1.50 | 0.70 | 0.90 | 0.60 | 0.90 | 0.50 | 0.80 | 0.50 |
| | 0.50 | 0.70 | 0.80 | 0.60 | 0.90 | 0.50 | 0.80 | 0.60 |
| | 0.70 | 0.50 | 0.90 | 0.50 | 0.90 | 0.60 | 0.80 | 0.60 |
| | 1.20 | 0.60 | 0.70 | 0.60 | 0.90 | 0.50 | 0.80 | 0.50 |
| | 0.60 | 0.80 | 0.80 | 0.70 | 0.80 | 0.50 | 0.80 | 0.50 |
| | 1.40 | 0.60 | 0.70 | 0.70 | 0.70 | 0.50 | 0.70 | 0.60 |
| | 1.00 | 0.70 | 0.70 | 0.70 | 0.70 | 0.60 | 0.70 | 0.50 |
| X̄ | 1.15 | 0.67 | 0.80 | 0.61 | 0.82 | 0.54 | 0.76 | 0.54 |
| SD | 0.32 | 0.08 | 0.08 | 0.08 | 0.08 | 0.05 | 0.052 | 0.05 |

TABLE 6-continued

| Sample No. | 2 | 2A | 3 | 3A | 4 | 4A | 5 | 5A |
|---|---|---|---|---|---|---|---|---|
| Coefficient of Variation | 27.8 | 11.9 | 10.0 | 13.3 | 0.8 | 0.3 | 6.8 | 9.3 |

What is claimed is:

1. A process for improving bubble stability, reducing film gauge variation and reducing melt fracture during extrusion and formation of film from a high density polyolefin of molecular weight above 225,000 to about 450,000 which comprises blending with said polyolefin about 0.1 to about 0.8% of an acrylic polymer polymerized from a monomer system comprising at least 50% by weight of methyl methacrylate.

2. A process according to claim 1 wherein said polyolefin is a homopolymer, copolymer, or terpolymer of ethylene, propylene, butene or hexene.

3. A process according to claim 1 wherein said acrylic polymer has a molecular weight of at least about 100,000.

4. A process according to claim 1 wherein said acrylic polymer is present in said polyolefin in an amount of about 0.1 to 0.3% by weight based on the weight of said polyolefin.

5. A process according to claim 1 wherein said monomer system comprises 100 percent of methyl methacrylate.

6. A process according to claim 1 wherein said high density polyolefin is produced by a gas phase fluidized bed process.

7. A film produced by the process of claim 1.

* * * * *